(12) United States Patent
Hsu et al.

(10) Patent No.: US 10,221,610 B2
(45) Date of Patent: Mar. 5, 2019

(54) DEPTH SENSOR FOR AUTOMATIC DOORS

(71) Applicant: Otis Elevator Company, Farmington, CT (US)

(72) Inventors: Arthur Hsu, South Glastonbury, CT (US); Alan Matthew Finn, Hebron, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/595,570

(22) Filed: May 15, 2017

(65) Prior Publication Data

US 2018/0328098 A1    Nov. 15, 2018

(51) Int. Cl.
| | |
|---|---|
| *E05F 15/73* | (2015.01) |
| *G06T 7/207* | (2017.01) |
| *G01B 11/22* | (2006.01) |
| *G06K 9/00* | (2006.01) |
| *G01S 17/08* | (2006.01) |
| *E05F 15/43* | (2015.01) |

(52) U.S. Cl.
CPC .............. *E05F 15/73* (2015.01); *G01B 11/22* (2013.01); *G01S 17/08* (2013.01); *G06K 9/00201* (2013.01); *G06T 7/207* (2017.01); *E05F 2015/433* (2015.01)

(58) Field of Classification Search
CPC .......... E05F 15/73; G06T 7/207; G01B 11/22; G01S 17/08; G06K 9/00201
See application file for complete search history.

(56) References Cited

U.S. PATENT DOCUMENTS

| | | | |
|---|---|---|---|
| 4,967,083 A | 10/1990 | Kornbrekke et al. | |
| 5,168,136 A | 12/1992 | Thangavelu et al. | |
| 5,219,042 A | 6/1993 | Sattar et al. | |
| 5,243,155 A | 9/1993 | Sirag, Jr. | |
| 5,329,076 A | 7/1994 | Kameli | |

(Continued)

FOREIGN PATENT DOCUMENTS

| | | |
|---|---|---|
| CN | 104864873 A | 8/2015 |
| EP | 0935044 A2 | 8/1999 |

(Continued)

OTHER PUBLICATIONS

Anonymous, "IDO sensors", online retrieve URL<http://www.idosensors.com/the-solution/>, 4 pages.

(Continued)

*Primary Examiner* — Curtis Odom
(74) *Attorney, Agent, or Firm* — Cantor Colburn LLP

(57) ABSTRACT

A door system is provided and includes=a door assembly operable to assume an open position at which an aperture is opened and a closed position at which the aperture is closed, a sensor assembly and a controller. The controller is coupled to the door assembly and configured to instruct the door assembly to normally assume the closed position and to assume the open position in accordance with an open signal being issued by the sensor assembly. The sensor assembly is configured to track the individual, determine whether the individual is likely to be approaching the aperture from the tracking and issue the open signal in accordance with a determination that the individual is likely to be approaching the aperture.

18 Claims, 3 Drawing Sheets

(56) References Cited

U.S. PATENT DOCUMENTS

| | | | |
|---|---|---|---|
| 6,114,956 | A | 9/2000 | Genechten |
| 7,623,674 | B2 | 11/2009 | Nichani et al. |
| 7,965,866 | B2 | 6/2011 | Wang et al. |
| 8,955,253 | B2 | 2/2015 | Kanki et al. |
| 2002/0157314 | A1* | 10/2002 | Takada .................. E05F 15/74 49/26 |
| 2003/0076271 | A1 | 4/2003 | Borlez et al. |
| 2003/0168288 | A1* | 9/2003 | Deplazes ................ H04N 7/18 187/317 |
| 2004/0045339 | A1 | 3/2004 | Nichani et al. |
| 2005/0168574 | A1 | 8/2005 | Lipton et al. |
| 2006/0053342 | A1 | 3/2006 | Bazakos et al. |
| 2006/0187037 | A1 | 8/2006 | Eubelen et al. |
| 2008/0089577 | A1 | 4/2008 | Wang |
| 2008/0285802 | A1 | 11/2008 | Bramblet et al. |
| 2010/0013656 | A1 | 1/2010 | Brown et al. |
| 2010/0039217 | A1 | 2/2010 | Borlez et al. |
| 2011/0051992 | A1 | 3/2011 | Cobb et al. |
| 2013/0251197 | A1 | 9/2013 | Liu et al. |
| 2013/0255154 | A1* | 10/2013 | Kanki .................... B66B 13/26 49/25 |
| 2014/0003710 | A1 | 1/2014 | Seow et al. |
| 2014/0312884 | A1 | 10/2014 | Reilio et al. |
| 2016/0289042 | A1 | 10/2016 | Fang et al. |
| 2016/0289044 | A1 | 10/2016 | Hsu et al. |
| 2016/0292515 | A1 | 10/2016 | Jia et al. |
| 2016/0292522 | A1 | 10/2016 | Chen et al. |

FOREIGN PATENT DOCUMENTS

| | | |
|---|---|---|
| EP | 1681424 A1 | 7/2006 |
| EP | 3098190 A1 | 11/2016 |
| WO | 2011054971 A2 | 5/2011 |

OTHER PUBLICATIONS

Anonymous, "Stop the false opening of automatic doors and save money!", online retrieve URL<http://www.idosensors.com/stop-the-false-opening-of-automatic-doors-and-save-money/>, 4 pages.

Bombini et al., "Intelligent Overhead Sensor for Sliding Doors: A Stereo Based Method for Augmented Efficiency", 2011, Abstract, 5 pages.

Yang et al., "An InAn Intelligent Automated Door Control System Based on a Smart Camera", Sensors, 2013, pp. 5923-5936.

Elbadramany, "Towards Calibration of Optical Flow of Crowd Videos Using Observed Trajectories", 2011, STARS Citation, 120 pages.

Kuramochi et al., "Recognition of Elevators with the Kinect Cane System for the Visually Impaired", 2014, IEEE,, 4 pages.

Liu et al., "Video Stabilization with a Depth Camera", 2012 IEEE, 7 pages.

Lladrovci, "Indoor navigation with motion tracking and depth perception sensors", 2016, Master's Thesis Master of Science in Applied Computer Science 30 ECTS, 69 pages.

Search Report dated Oct. 18, 2018, EP Applicatino No. 18172467, 8 pages.

\* cited by examiner

DEPTH SENSOR FOR AUTOMATIC DOORS

BACKGROUND

The following description relates to automatic doors and, more particularly, to a depth sensor for use with automatic doors.

Automatic doors provide conveniences for pedestrians whereby they can enter and exit a building without having to pull or push open a door. Door detectors that activate the automatic doors are typically motion sensors that are triggered when someone is present near an entranceway. However, since there are many situations where the doors are near a sidewalk or a perpendicular corridor, pedestrians standing near to doors or walking past the doors may unintentionally trigger the door detector and cause the doors to open needlessly. This leads to loss of conditioned air from the building, creates a distraction, increases noise and reduces the lifetime of the doors.

BRIEF DESCRIPTION

According to one aspect of the disclosure, a door system is provided and includes a door assembly operable to assume an open position at which an aperture is opened and a closed position at which the aperture is closed, a sensor assembly and a controller. The controller is coupled to the door assembly and configured to instruct the door assembly to normally assume the closed position and to assume the open position in accordance with an open signal being issued by the sensor assembly. The sensor assembly is configured to generate a series of maps for an individual proximate to the aperture, track the individual based on the series of maps, determine whether the individual is likely to be approaching the aperture from the tracking and issue the open signal in accordance with a determination that the individual is likely to be approaching the aperture.

In accordance with additional or alternative embodiments, the door assembly includes at least one or more doors and a motor which drives movements of the one or more doors based on instructions generated by the controller.

In accordance with additional or alternative embodiments, the sensor assembly is operably disposed on opposite sides of a wall defining the aperture.

In accordance with additional or alternative embodiments, the sensor assembly includes a depth sensor.

In accordance with additional or alternative embodiments, the sensor assembly includes a high dynamic range (HDR) sensor.

In accordance with additional or alternative embodiments, the sensor assembly includes an emitter configured to send out signals toward the individual proximate to the aperture, a receiver configured to receive reflections of the signals which are reflected off of the individual and a processor configured to generate the maps based on the received reflections.

In accordance with additional or alternative embodiments, the signals include infrared (IR) signals.

In accordance with additional or alternative embodiments, the signals are modulated.

In accordance with additional or alternative embodiments, the sensor assembly is further configured to immediately issue a close signal in accordance with a determination that the individual passed through the aperture and the controller is configured to instruct the door assembly to immediately assume the closed position in accordance with the close signal being issued by the sensor assembly.

In accordance with additional or alternative embodiments, an elevator system is provided with the door system to track individuals boarding and exiting from an elevator car.

According to another aspect of the disclosure, a method of operating a sensor assembly of a door system is provided. The method includes tracking an individual proximate to an aperture opened and closed by doors of the door system, determining whether the individual is likely to be approaching the aperture from the tracking and issuing an open signal to lead to an opening of the doors of the door system in accordance with a determination that the individual is likely to be approaching the aperture.

In accordance with additional or alternative embodiments, the sensor assembly includes a depth sensor.

In accordance with additional or alternative embodiments, the sensor assembly includes a high dynamic range (HDR) sensor.

In accordance with additional or alternative embodiments, the sensor assembly includes an emitter configured to send out signals toward the individual proximate to the aperture, a receiver configured to receive reflections of the signals which are reflected off of the individual and a processor configured to generate maps based on the received reflections.

In accordance with additional or alternative embodiments, the signals include infrared (IR) signals.

In accordance with additional or alternative embodiments, the signals are modulated.

In accordance with additional or alternative embodiments, the method further includes sending out signals toward the individual proximate to the aperture, receiving reflections of the signals which are reflected off of the individual and generating maps based on the received reflections.

In accordance with additional or alternative embodiments, the method further includes modulating the signals.

In accordance with additional or alternative embodiments, the method further includes immediately issuing a close signal to lead to an immediate closing of the doors of the door system in accordance with a determination that the individual passed through the aperture.

According to yet another aspect of the disclosure, a method of operating a sensor assembly of a door system is provided. The method includes generating a series of maps for individuals proximate to an aperture opened and closed by doors of the door system based on modulated infrared (IR) signals being sent out from and reflected toward the sensor assembly, tracking the individuals based on the series of maps, determining whether the individuals are likely to be approaching the aperture from the tracking and issuing an open signal to lead to an opening of the doors of the door system in accordance with a determination that at least one of the individuals is likely to be approaching the aperture.

In accordance with additional or alternative embodiments, the method further includes immediately issuing a close signal to lead to an immediate closing of the doors of the door system in accordance with a determination that the at least one of the individuals passed through the aperture.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

As will be described below, a system is provided for distinguishing between a person who is approaching the door from another person who is merely passing and is particularly applicable to automatic door control cases in which the automatic doors being controlled are entrances/exits from buildings that are adjacent to perpendicular sidewalks or corridors. The system employs a 3D depth sensor that outputs a series of spatial maps from which a ground plane (x,y) position of each person is computed. By analyzing a successive series of spatial maps, one or more persons can be tracked to thereby create a trajectory for each person or group of people. By projecting these trajectories, whether or not each person is approaching a doorway, passing by the entranceway, moving away from the entranceway or is loitering can be estimated. Accordingly, the system is a "smart" door detector system and can send a signal to the door controller only when it detects that one or more people intend to enter or exit. Moreover, where conventional proximity sensors often need to be centered over the doors, the system described herein has more flexibility on mounting locations since the system will be able to ascertain a location of doors or an aperture relative to a sensor and then will be able to compare a trajectory of individuals relative to the doors or aperture.

Figure 1:
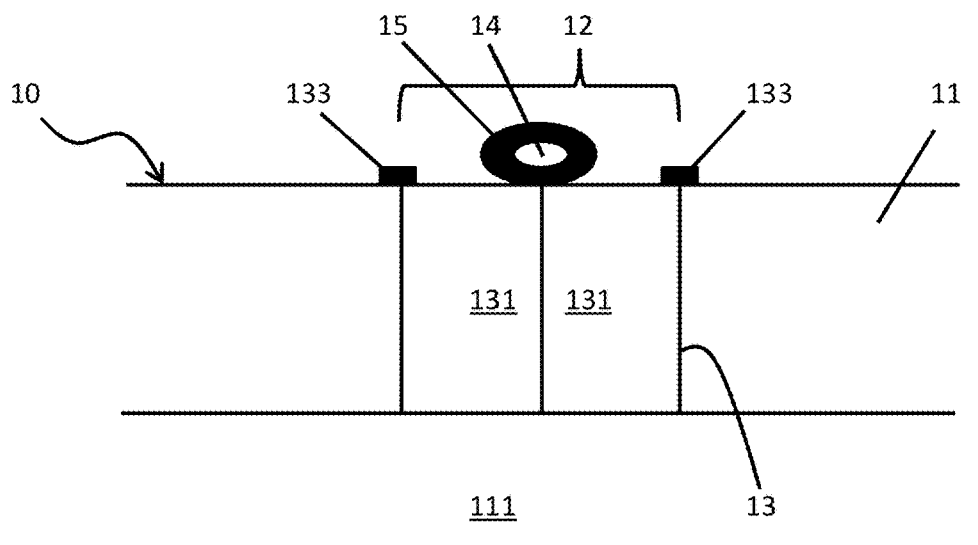
FIG. 1 is an elevational view of a door system in accordance with embodiments.
Figure 2:
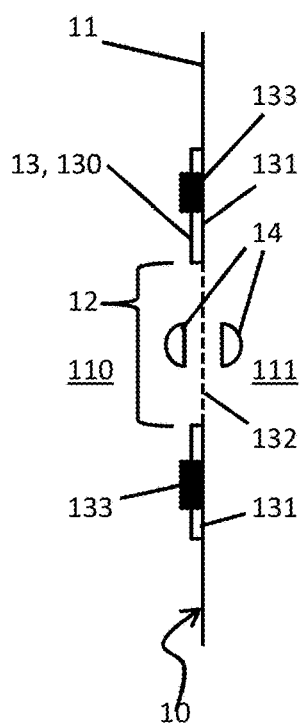
FIG. 2 is a top down view of the door system of FIG. 1 with a door assembly thereof assuming an open position.
Figure 3:
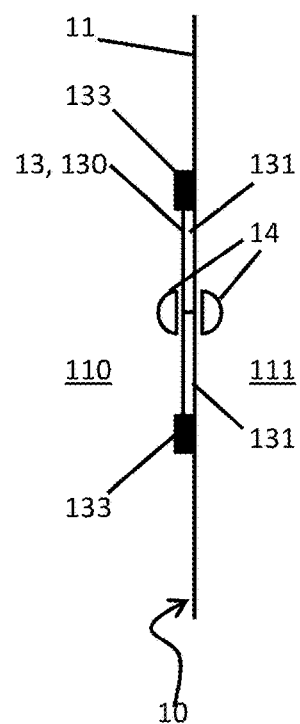
FIG. 3 is a top down view of the door system of FIG. 1 with the door assembly thereof assuming a closed position.

With reference to FIGS. 1-3, a door system 10 is provided. The door system 10 includes a wall 11 that is formed to define an aperture 12, a door assembly 13, a sensor assembly 14 and a controller 15. In some cases, the wall 11 separates an interior space 110 from an exterior space 111 and, in still other cases, the exterior space 111 may be an exterior of a building. The door assembly 13 may be provided as an automatic door assembly 130 and is operable to assume an open position (see FIG. 2) at which the aperture 12 is opened and a closed position (see FIG. 3) at which the aperture 12 is closed. It is to be understood that when the door assembly 13 assumes the open position, as shown in FIG. 2, conditioned air provided in the interior space 110 is permitted to flow into the exterior space 111. As such, and for additional reasons as well, the door assembly 13 is generally configured to normally assume the closed position and to only open when an individual is intended to pass through the aperture 12 to either enter or leave the interior space 110.

In accordance with embodiments, where the door assembly 13 is provided as the automatic door assembly 130, the door assembly 13 may include at least one or more doors 131 and a motor 133. The motor 133 may be provided to drive sliding or rotational movements of the one or more doors 131 based on instructions generated by the controller 15.

In some particular cases, the door assembly 13 is provided for use with an elevator system in which the aperture 12 leads to and from and elevator car that individuals can enter and exit from. In such cases, either the interior space 110 or the exterior space 111 may be regarded as the interior of the elevator car depending on how one defines the interior and exterior spaces 110 and 111.

Figure 4:
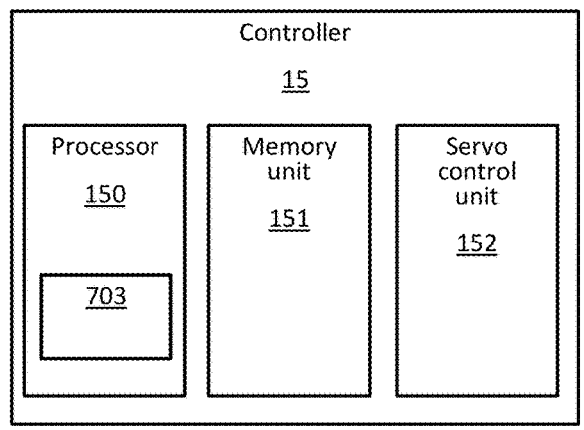
FIG. 4 is a schematic illustration of a processor of the door system of FIGS. 1-3.

With reference to FIG. 4, the controller 15 is operably coupled to the door assembly 13 and configured to instruct the door assembly 13 to normally assume the closed position as shown in FIG. 3 and to assume the open position as shown in FIG. 2 in accordance with an open signal being issued by the sensor assembly 14. To this end, the controller 15 may include a processor 150 such as a central processing unit (CPU), a memory unit 151 which may include one or both of read-only and random access memory and a servo control unit 152. During operations of the door assembly 13, executable program instructions stored in the memory unit 151 are executed by the processor 150 which in turn causes the servo control unit 152 to selectively issue the open signal to the motor 133 in accordance with readings generated by the sensor assembly 14.

That is, the processor 150 causes the servo control unit 152 to selectively issue the open signal to the motor 133 such that the door assembly 13 assumes the open position when readings of the sensor assembly 14 indicate that an individual is moving toward and likely intending to pass through the aperture 12 from either the interior space 110 (in which case the individual is likely to be exiting the interior space 110) or the exterior space 111 (in which case the individual is likely to be entering the interior space 110). Moreover, the processor 150 prohibits the issuance of the open signal to the motor 133 such that the door assembly 13 remains in the closed position when readings of the sensor assembly 14 indicate that the individual (or all individuals) is only be standing near or walking past the aperture 12 with no intention of imminently or immediately passing through the aperture 12 or moving away from the aperture 12.

With reference back to FIGS. 2 and 3, the sensor assembly 14 may be operably disposed on at least one or both sides of the wall 11 and may be provided as a 3D depth sensor and/or as a high dynamic range sensor. Where sensor assembly 14 is disposed on one side of wall 11 or on wall 11 itself, it may be disposed so as to be able to sense through the doors 131 or the wall 11 where the doors 131 or the wall 11 are effectively transparent at least to the sensor assembly 14. Moreover, it is to be understood that the aperture 12 need to be a two-way aperture and that some embodiments exist in which traffic through the aperture 12 is predominantly one-way traffic. In still other embodiments, the aperture 12 may be defined between unsecured and secured areas such that passage through the aperture 12 is permitted only for authorized personnel. In such cases, the systems and methods described herein are or may be integrated into the security system.

Various 3D depth sensing sensor technologies and devices that can be used in sensor assembly 14 include, but are not limited to, a structured light measurement, phase shift measurement, time of flight measurement, stereo triangulation device, sheet of light triangulation device, light field cameras, coded aperture cameras, computational imaging techniques, simultaneous localization and mapping (SLAM), imaging radar, imaging sonar, echolocation, laser radar, scanning light detection and ranging (LIDAR), flash LIDAR, or a combination of at least one of the foregoing. Different technologies can include active (transmitting and receiving a signal) or passive (only receiving a signal) sensing and may operate in a band of the electromagnetic or acoustic spectrum such as visual, infrared, ultrasonic, etc. In various embodiments, a depth sensor may be operable to produce depth from defocus, a focal stack of images or structure from motion.

Figure 5A:
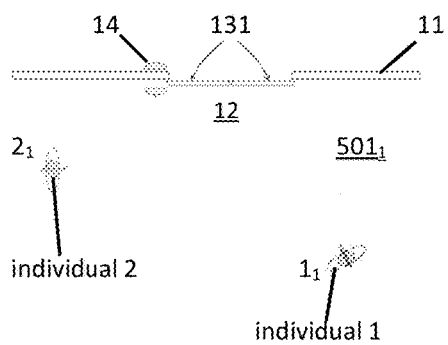
FIG. 5A is a spatial map generated by a processor of a controller of the door system of FIGS. 1-3.
Figure 5B:
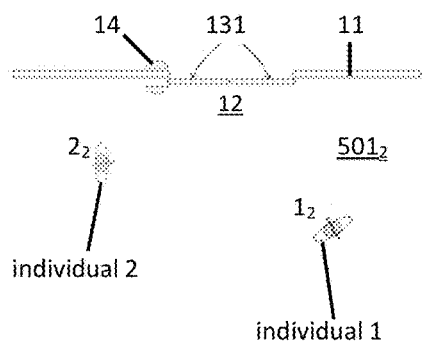
FIG. 5B is a spatial map generated by the processor of the controller of the door system of FIGS. 1-3.
Figure 5C:
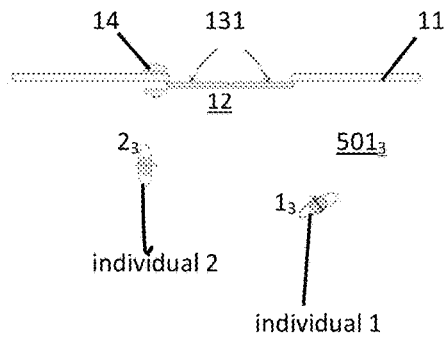
FIG. 5C is a spatial map generated by the processor of the controller of the door system of FIGS. 1-3.
Figure 5D:
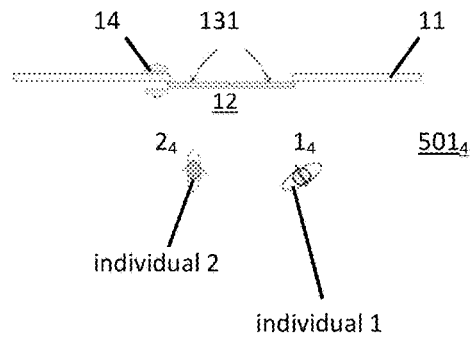
FIG. 5D is a spatial map generated by the processor of the controller of the door system of FIGS. 1-3.
Figure 6:
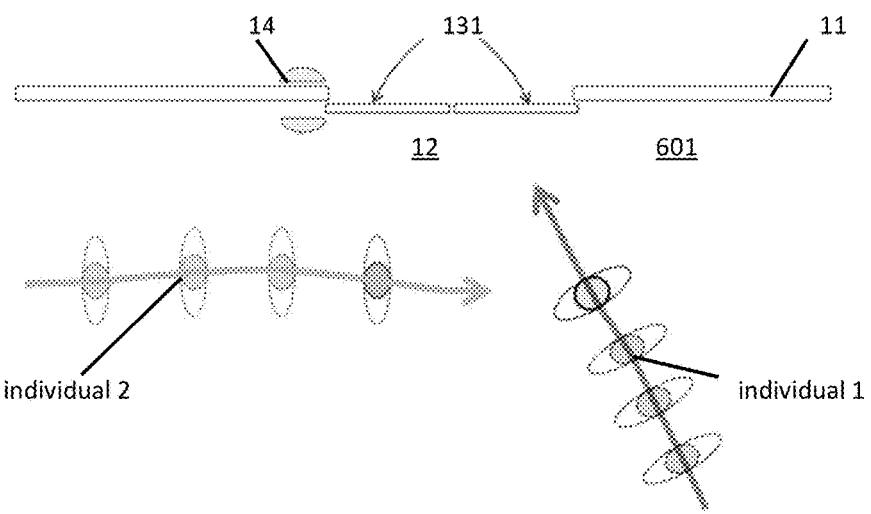
FIG. 6 is comprehensive spatial map generated by the processor of the controller of the door system of FIGS. 1-3.

In any case, with reference to FIGS. 5A-D and FIG. 6, the sensor assembly 14 is configured to generate a series of spatial maps $501_{1-4}$ which can be superimposed on one another in a comprehensive spatial map 601 for each or all of the individuals proximate to the aperture 12 and thereby track the individuals based on the series of spatial maps $501_{1-4}$ (while the comprehensive spatial map 601 in FIG. 6 is illustrated as being provided for two individuals, this is being done for clarity and brevity and it is to be understood that the individuals can be tracked separately in respective comprehensive spatial maps). Thus, as shown in FIG. 5A, spatial map $501_1$ indicates that individual 1 is in a first position $1_1$ relative to the aperture 12 and that individual 2 is in a first position $2_1$ relative to the aperture 12, as shown in FIG. 5B, spatial map $501_2$ indicates that individual 1 is in a second position $1_2$ relative to the aperture 12 and that individual 2 is in a second position $2_2$ relative to the aperture 12, as shown in FIG. 5C, spatial map $501_3$ indicates that individual 1 is in a third position $1_3$ relative to the aperture 12 and that individual 2 is in a third position $2_3$ relative to the aperture 12 and, as shown in FIG. 5D, spatial map $501_4$ indicates that individual 1 is in a fourth position $1_4$ relative to the aperture 12 and that individual 2 is in a fourth position $2_4$ relative to the aperture 12.

According to one or more embodiments, the tracking may be by detection and tracking processes such as background subtraction, morphological filtering and a Bayesian Filtering method that can be executed by devices such as a Kalman Filter or a Particle Filter. Background subtraction to produce foreground object(s) may be achieved by a Gaussian Mixture Model, a Codebook Algorithm, Principal Component Analysis (PCA) and the like. Morphological filtering may be a size filter to discard foreground object(s) that are not persons (e.g., they are too small, have an inappropriate aspect ratio and the like). A Bayesian Filter may be used to estimate the state of a filtered foreground object where the state may be position, velocity, acceleration and the like.

Therefore, comprehensive spatial map 601, which includes the indications of each of the spatial maps $501_{1-4}$, illustrates that from the tracking of individuals 1 and 2 across the spatial maps $501_{1-4}$, it can be determined that individual 1 is likely approaching the aperture 12 and that individual 2 is likely to be walking past the aperture (again, it is noted that the comprehensive spatial map 601 need not be provided for tracking individuals 1 and 2 and that other embodiments exist in which individuals 1 and 2 are tracked separately). With such determinations having been made, the processor 150 causes the servo control unit 152 to selectively issue the open signal to the motor device 133 such that the door assembly 13 assumes the open position for the individual 1. Additionally, from the tracking information, if a determination is made that individual 1 has passed through aperture 12 and there are no other individuals approaching aperture 12 or within aperture 12, then the processor 150 may cause the servo control unit 152 to selectively issue the close signal to the motor 133 such that the door assembly 13 promptly assumes the closed position rather than waiting for a fixed length of time before closing.

With the door assembly 13 being opened for individual 1, individual 2 can enter the interior space 110 with the individual 1 since they are proximate to the aperture 12 at substantially similar times. However, if individuals 1 and 2 were not proximate to the aperture 12 at similar times, it is to be understood that the door assembly 13 would assume the open position for individual 1 but not for individual 2. In addition, it is also understood that over time, patterns of pathways taken by various individuals who are entering/exiting the interior space 110 versus those individuals who are walking past or standing near the aperture 12 can be stored and used to update the processing of the processor 150. Thus, the determinations of whether a given future individual is entering/exiting the interior space 110 given his corresponding spatial maps and comprehensive spatial map can be improved.

Figure 7:
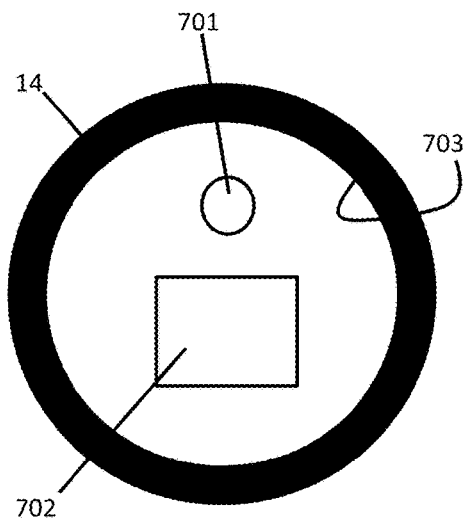
FIG. 7 is a schematic illustration of a sensor assembly of the door system of FIGS. 1-3 in accordance with embodiments.
Figure 8:
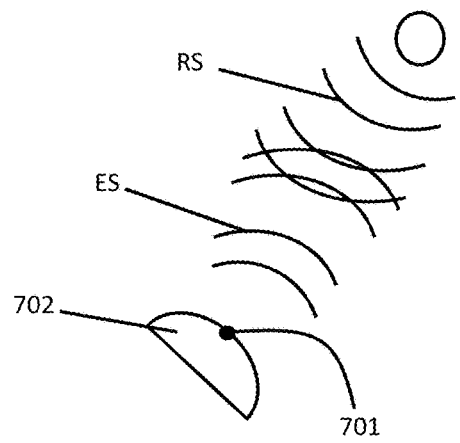
FIG. 8 is a schematic diagram illustrating an operation of the sensor assembly of FIG. 7.

In accordance with embodiments and, with reference to FIGS. 7 and 8, the sensor assembly 14 may include an emitter 701, a receiver 702 and a processor 703. The emitter 701 is configured to send out signals ES, such as electromagnetic signals like infrared (IR) signals and ultraviolet (UV) signals or other acoustic or ultrasonic signals that can be emitted outwardly in eye-safe manners, toward those individuals who are proximate to the aperture 12. The receiver 702 is configured to receive reflections of the signals RS which are reflected off of those individuals who are proximate to the aperture 12. The processor 703 may be a component of the processor 150 (see FIG. 4) or separate from the processor 150 and in any case is configured to generate the spatial maps based on the received reflections of the signals RS. It should be understood that alternative methods of generating spatial maps (e.g., a 2D acoustic phased array), are within the scope of this invention. In such an embodiment, the signals ES and RS are pressure waves.

In accordance with further embodiment, the EM signals ES may be modulated over time in terms of amplitude and frequency. In this way, the received reflections of the EM signals RS would be expected to exhibit similar amplitude and frequency modulation and thus can be distinguished from noise associated with ambient light signals. Thus, the sensor assembly 14 can be deployed in various environments including, in particular, environments in which the exterior space 111 is actually outdoors and characterized by a substantial amount of ambient light that might otherwise interfere with a performance of a conventional sensor assembly.

The purpose of the "smart" door detector and the systems described herein is that doors are only opened when people are entering (or exiting) the doorway or imminently approaching the doorway rather than being indiscriminately opened whenever anyone is nearby. The benefits are thus manifested as reduced HVAC costs by not releasing heated/cooled air to an unconditioned space, reduced wear and tear on the doors, reduced noise and reduced distractions for people near the doorway.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A door system, comprising:
a door assembly operable to assume an open position at which an aperture is opened and a closed position at which the aperture is closed;
a sensor assembly; and
a controller coupled to the door assembly and configured to instruct the door assembly to normally assume the closed position and to assume the open position in accordance with an open signal being issued by the sensor assembly,
the sensor assembly comprising an emitter configured to send out signals toward an individual, a receiver configured to receive reflections of the signals which are reflected off of the individual and a processor configured to generate maps based on the received reflections, the sensor assembly being configured to:
track the individual based on the maps,
determine whether the individual is likely to be approaching the aperture from the tracking, and
issue the open signal in accordance with a determination that the individual is likely to be approaching the aperture.

2. The door system according to claim 1, wherein the door assembly comprises:
at least one or more doors; and
a motor which drives movements of the one or more doors based on instructions generated by the controller.

3. The door sensor according to claim 1, wherein the sensor assembly is operably disposed on opposite sides of a wall defining the aperture.

4. The door system according to claim 1, wherein the sensor assembly comprises a depth sensor.

5. The door system according to claim 1, wherein the sensor assembly comprises a high dynamic range (HDR) sensor.

6. The door system according to claim 1, wherein the signals comprise infrared (IR) signals.

7. The door system according to claim 1, wherein the signals are modulated.

8. The door system according to claim 1, wherein:
the sensor assembly is further configured to immediately issue a close signal in accordance with a determination that the individual passed through the aperture, and
the controller being configured to instruct the door assembly to immediately assume the closed position in accordance with the close signal being issued by the sensor assembly.

9. An elevator system in which the door system of claim 1 is provided to track individuals boarding and exiting from an elevator car.

10. A method of operating a sensor assembly of a door system, the sensor assembly comprising an emitter configured to send out signals toward an individual, a receiver configured to receive reflections of the signals which are reflected off of the individual and a processor configured to generate maps based on the received reflections the method comprising:
tracking an individual based on the maps proximate to an aperture opened and closed by doors of the door system;
determining whether the individual is likely to be approaching the aperture from the tracking; and
issuing an open signal to lead to an opening of the doors of the door system in accordance with a determination that the individual is likely to be approaching the aperture.

11. The method according to claim 10, wherein the sensor assembly comprises a depth sensor.

12. The method according to claim 10, wherein the sensor assembly comprises a high dynamic range (HDR) sensor.

13. The method according to claim 10, wherein the signals comprise infrared (IR) signals.

14. The method according to claim 10, wherein the signals are modulated.

15. The method according to claim 10, further comprising:
sending out signals toward the individual;
receiving reflections of the signals which are reflected off of the individual; and
generating maps based on the received reflections.

16. The method according to claim 15, further comprising modulating the signals.

17. The method according to claim 10, further comprising immediately issuing a close signal to lead to an immediate closing of the doors of the door system in accordance with a determination that the individual passed through the aperture.

18. A method of operating a sensor assembly of a door system, the method comprising:
generating a series of maps for individuals proximate to an aperture opened and closed by doors of the door system based on modulated signals being sent out from and reflected toward the sensor assembly;
tracking the individuals based on the series of maps;
determining whether the individuals are likely to be approaching the aperture from the tracking; and
issuing an open signal to lead to an opening of the doors of the door system in accordance with a determination that at least one of the individuals is likely to be approaching the aperture.

* * * * *